(12) United States Patent
Pellow et al.

(10) Patent No.: US 10,395,296 B2
(45) Date of Patent: Aug. 27, 2019

(54) DATABASE MINING TECHNIQUES FOR GENERATING CUSTOMER-SPECIFIC MAPS IN RETAIL APPLICATIONS

(71) Applicant: Wal-Mart Stores, Inc., Bentonville, AR (US)

(72) Inventors: Benjamin Pellow, Oakland, CA (US); Emily Poplawski, Palo Alto, CA (US); Stephen Aase, Boise, ID (US)

(73) Assignee: WALMART APOLLO, LLC, Bentonville, AR (US)

(*) Notice: Subject to any disclaimer, the term of this patent is extended or adjusted under 35 U.S.C. 154(b) by 794 days.

(21) Appl. No.: 15/010,394

(22) Filed: Jan. 29, 2016

(65) Prior Publication Data
US 2017/0221119 A1   Aug. 3, 2017

(51) Int. Cl.
*G06Q 30/06* (2012.01)

(52) U.S. Cl.
CPC ..... *G06Q 30/0625* (2013.01); *G06Q 30/0639* (2013.01); *G06Q 30/0643* (2013.01)

(58) Field of Classification Search
CPC ................................................. G06Q 30/06–08
USPC ................................................. 705/26.1–27.2
See application file for complete search history.

(56) References Cited

U.S. PATENT DOCUMENTS

| | | | |
|---|---|---|---|
| 6,844,821 B2 | 1/2005 | Swartzel et al. | |
| 2006/0097044 A1* | 5/2006 | Boyd | G06Q 30/02 235/383 |
| 2006/0265294 A1 | 11/2006 | de Sylva | |
| 2007/0118429 A1* | 5/2007 | Subotovsky | G06Q 30/02 705/26.9 |
| 2007/0281689 A1 | 12/2007 | Altman et al. | |
| 2008/0228600 A1 | 9/2008 | Treyz et al. | |
| 2012/0150653 A1* | 6/2012 | Bennett | G06Q 30/0207 705/14.58 |
| 2014/0274107 A1 | 9/2014 | Rados | |

(Continued)

OTHER PUBLICATIONS

Find Items Even Easier with 'Search My Store' by Wendy Bergh Vice President, Mobile and Digital Strategy, Walmart, available at: https://blog.walmart.com/innovation/20141031, Oct. 31, 2014 (Year: 2014).*

(Continued)

*Primary Examiner* — Ming Shui
(74) *Attorney, Agent, or Firm* — Bryan Cave Leighton Paisner LLP

(57) ABSTRACT

Techniques related to presentation of consumer-specific maps are disclosed. The techniques involve accessing, with a search engine module, from at least one database, map data defining a layout of a retail facility, product data identifying products for sale at the retail facility, location data defining a location of the products, purchase data relating to products previously purchased by a specific consumer, and promotion data identifying promotions available for the products. A processor analyzes the data and correlates promotions with the products previously purchased by the specific consumer. The processor generates a map of the layout of the retail facility that is presentable on a display of a computing device. The map indicates with respect to the layout the location of the products previously purchased by the specific consumer and the promotions correlated with the products previously purchased by the specific consumer.

20 Claims, 5 Drawing Sheets

(56) References Cited

U.S. PATENT DOCUMENTS

2016/0203429 A1    7/2016    Mellott et al.
2017/0220983 A1    8/2017    Pellow et al.
2017/0221170 A1    8/2017    Pellow et al.

OTHER PUBLICATIONS

Walmart & Target Store Maps Now Live!, available at: https://www.bfads.net/Walmart-and-Target-Store-Maps-Now-Live, Nov. 19, 2015 (Year: 2015).*
Utility U.S. Appl. No. 15/010,354, filed Jan. 29, 2016 entitled "System, Method, and Non-Transitory Computer-Readable Storage Media Related to Re-Stocking Maps".
Utility U.S. Appl. No. 15/010,449, filed Jan. 29, 2016 entitled "System, Method, and Non-Transitory Computer-Readable Storage Media Related to Concurrent Presentation of Retail Facility Maps".

* cited by examiner

DATABASE MINING TECHNIQUES FOR GENERATING CUSTOMER-SPECIFIC MAPS IN RETAIL APPLICATIONS

FIELD OF THE DISCLOSURE

U.S. patent Classification Primary Class: 707 (DATA PROCESSING: DATABASE, DATA MINING, AND FILE MANAGEMENT OR DATA STRUCTURES). Art Unit: 2161.

The disclosure is related to systems, methods, and computer-readable storage media that perform data requests to mine various databases for retail applications.

BACKGROUND

Retailers commonly advertise promotions, sales, discounts, and deals for products offered for sale in physical retail stores. Such advertisements come in a variety of forms from weekly print ads, weekly online ads, displays within the store, etc. Such online ads or product displays are presented to large groups of consumers who interact with the advertisement. As such, conventional ways of promoting the sale of products in physical retail stores are inefficient because they blindly present such advertisements without tailoring such promotions to the needs or desires of any one specific consumer. Moreover, the inherent practical limitations of such conventional means of advertising prevent such consumer-specific tailoring.

Furthermore, retailers commonly offer tens of thousands of products for sale to the consumers in stores. To offer such a substantial amount of products, retailers require stores of considerable size. With stores of such considerable size, consumers who are physically present in the store commonly overlook products of specific interest to them that may have promotions. For example, a promoted product of specific interest to the consumer may be located at an opposing end of the store where the consumer had no intention of approaching. Unless the consumer was to manually investigate every store aisle, one by one, the consumer would have no idea that such product of interest was subject to a promotion. Moreover, consumers may not know that they even need such products of interest and may be unaware of the location of such promoted product of interest in the store. Accordingly, conventional techniques of advertising within the physical store cause a loss of potential sales because the consumer is not made aware, on an individual basis, of the identity, location and promotions available to products of interest to the specific consumer.

The present invention is aimed at least one or more of the problems identified above.

SUMMARY

In one embodiment, a system is provided comprising at least one database. The at least one database comprises map data defining a layout of a retail facility, product data identifying products for sale at the retail facility, location data defining a location of products for sale at the retail facility, purchase data relating to at least one product previously purchased by a specific consumer, and promotion data identifying at least one promotion available for the products at the retail facility. A search engine module is configured to access the map data, location data, purchase data, and promotion data. A processor is configured to correlate, using the product data, purchase data and promotion data, the at least one promotion with the at least one product previously purchased by the specific consumer. The processor generates for presentation on a display of a computing device a map of the layout of the retail facility. The map indicates with respect to the layout the location of the at least one product previously purchased by the specific consumer and the at least one promotion correlated with the at least one product previously purchased by the specific consumer.

In other embodiments, a computer-implemented method is provided. The computer-implemented method includes the step of accessing, with a search engine module, from at least one database, map data defining a layout of a retail facility, product data identifying products for sale at the retail facility, location data defining a location of products for sale at the retail facility, purchase data relating to at least one product previously purchased by a specific consumer, and promotion data identifying at least one promotion available for the products at the retail facility. The computer-implemented method includes the step of analyzing, using a processor, the map data, the location data, the product data, the purchase data and the promotion data. The processor correlates the at least one promotion with the at least one product previously purchased by the specific consumer. The computer-implemented method includes the step of generating, using the processor, a map of the layout of the retail facility that is presentable on a display of a computing device. The map indicates with respect to the layout the location of the at least one product previously purchased by the specific consumer and the at least one promotion correlated with the at least one product previously purchased by the specific consumer.

In still other embodiments, one or more non-transitory computer-readable storage media have computer-executable instructions embodied thereon. When executed by at least one processor, the computer-executable instructions cause the processor to access from at least one database, map data defining a layout of a retail facility, product data identifying products for sale at the retail facility, location data defining a location of products for sale at the retail facility, purchase data relating to at least one product previously purchased by a specific consumer, and promotion data identifying at least one promotion available for the products at the retail facility. The computer-executable instructions cause the processor to analyze the map data, the location data, the product data, the purchase data and the promotion data. The computer-executable instructions cause the processor to correlate the at least one promotion with the at least one product previously purchased by the specific consumer. The processor generates a map of the layout of the retail facility that is presentable on a display of a computing device. The map indicates with respect to the layout the location of the at least one product previously purchased by the specific consumer and the at least one promotion correlated with the at least one product previously purchased by the specific consumer.

The system, computer-implemented method, and non-transitory computer-readable storage media are configured to use data mining techniques to provide a map indicating the location of the product previously purchased by the specific consumer with respect to the layout of the retail store. This revolutionizes conventional methods of advertising products for sale physically within the retail store. The techniques described herein reduce the need for advertising techniques that are presented to large groups of consumers. Instead, the promotion is specifically correlated with the at least one product previously purchased by the specific consumer, thereby promoting the sale of products that the consumer is more likely to consider purchasing. Thus, the system, computer-implemented method, and non-transitory computer-readable storage media provide efficient promotion of the sale of products in physical retail stores because such promotions are specifically tailored to the needs or desires of specific consumer.

Additionally, the techniques described herein advantageously inform the specific consumer of the promotion correlated with the product as well as location of the product within the store. Considering the size of stores and the amount of products offered, consumers who are physically present in the store are less likely to overlook products of specific interest to them that may have promotions because the computing device displays such promotions on the map according to the techniques described herein. For example, by displaying on the map, the location and promotion associated with a specific product of interest to the consumer, based at least on the consumers past purchase history, the consumer is more likely to approach such product. This is true even if the consumer had no previous intention of approaching that region of the physical store and even if the consumer had no previous intention of purchasing that product before entering the store. Accordingly, the techniques described herein are likely to increase potential sales because the consumer is made aware, on an individual basis, of the identity, location and promotions available to products of interest to the specific consumer as the consumer navigates the physical store.

BRIEF DESCRIPTION OF THE FIGURES

Other advantages of the present disclosure will be readily appreciated, as the same becomes better understood by reference to the following detailed description when considered in connection with the accompanying drawings wherein.

Figure 1:
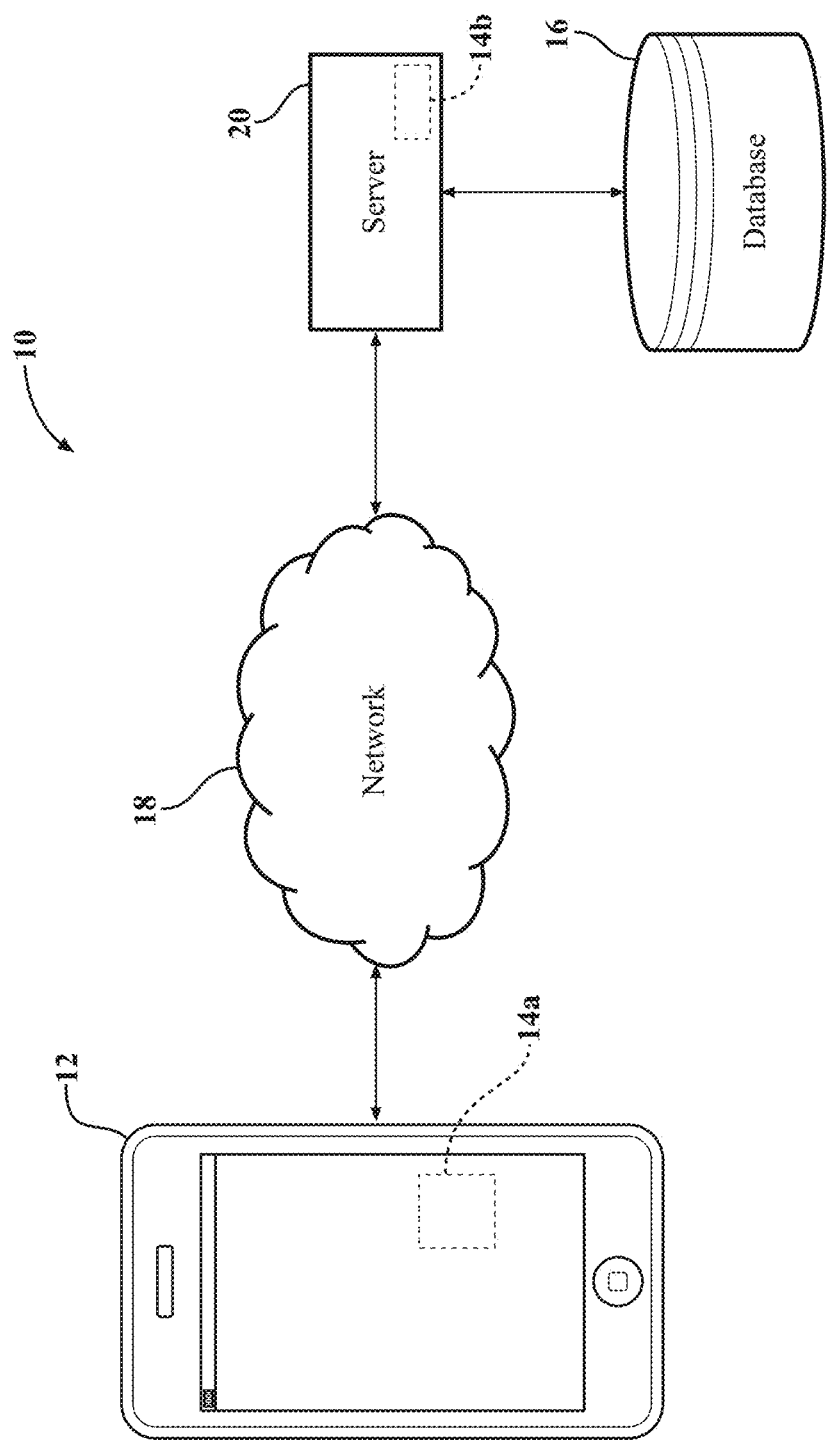
FIG. 1 is a schematic illustration of a system for providing presentation of a consumer-specific map, according to one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

A. System and Method Overview

Referring to the Figures, wherein like parts or components are identified using like numerals throughout the several views, one example of a system 10 is provided in FIG. 1. The system 10 is utilized for aiding in promotion of products offered for sale at a retail facility that are tailored to a specific consumer.

Other features of the system 10 can be found in commonly owned U.S. patent application Ser. No. 15/010,354, filed on Jan. 29, 2016 and commonly owned U.S. patent application Ser. No. 15/010,449, filed on Jan. 29, 2016, which are hereby incorporated by reference in their entirety.

As used herein, the term "retail facility" may refer to any store, business or a combination of businesses that sells and/or offers to sell products or services to a consumer. Examples of a retail store include grocery stores, malls, department stores, convenient stores, etc. The retail facility may be representative of a larger corporate environment, which may provide many avenues of interface with the consumer. A retailer operates the retail facility. The retail facility is typically a brick and mortar type store. In other words, the retail facility is a physical store rather than a purely online store.

The system 10 includes a computing device 12, a processor 14, a data composition module, or hereinafter, search engine module 15, and at least one database 16. The computing device 12 is configured to access data from the database(s) 16 via a network 18 using, in one embodiment, the search engine module 15. In some embodiments, a server 20 may communicate with the computing device 12, and vice-versa. The term "search engine" module is not intended to limit the functionality of the module to merely searching. Instead, the search engine module 15 may perform a variety of tasks, including processing, capturing, compiling, analyzing, and/or making determinations about data. The search engine module 15 may be implemented at a composition layer, data layer, or the like.

The computing device 12 is operated or possessed by a consumer. The consumer is preferably any individual who shops at the retail facility. However, the individual may be any other individual capable of using the techniques described herein. For example, the individual may be any employee contractor, service provider, or the like.

The computing device 12 comprises, or is in communication with, a display 22. The display 22 allows the presentation of information to make the consumer aware of at least the location and the promotions correlated with products offered for sale at the retail facility.

The processor 14 may be implemented by the computing device 12, the server 20, or both. When implemented by both, the computing device 12 may comprise at least one processor 14a, and the server 20 may implement at least another processor 14b, as shown in FIG. 1. Those skilled in the art appreciate that various other configurations are possible without departing from the scope of the invention.

Figure 5:
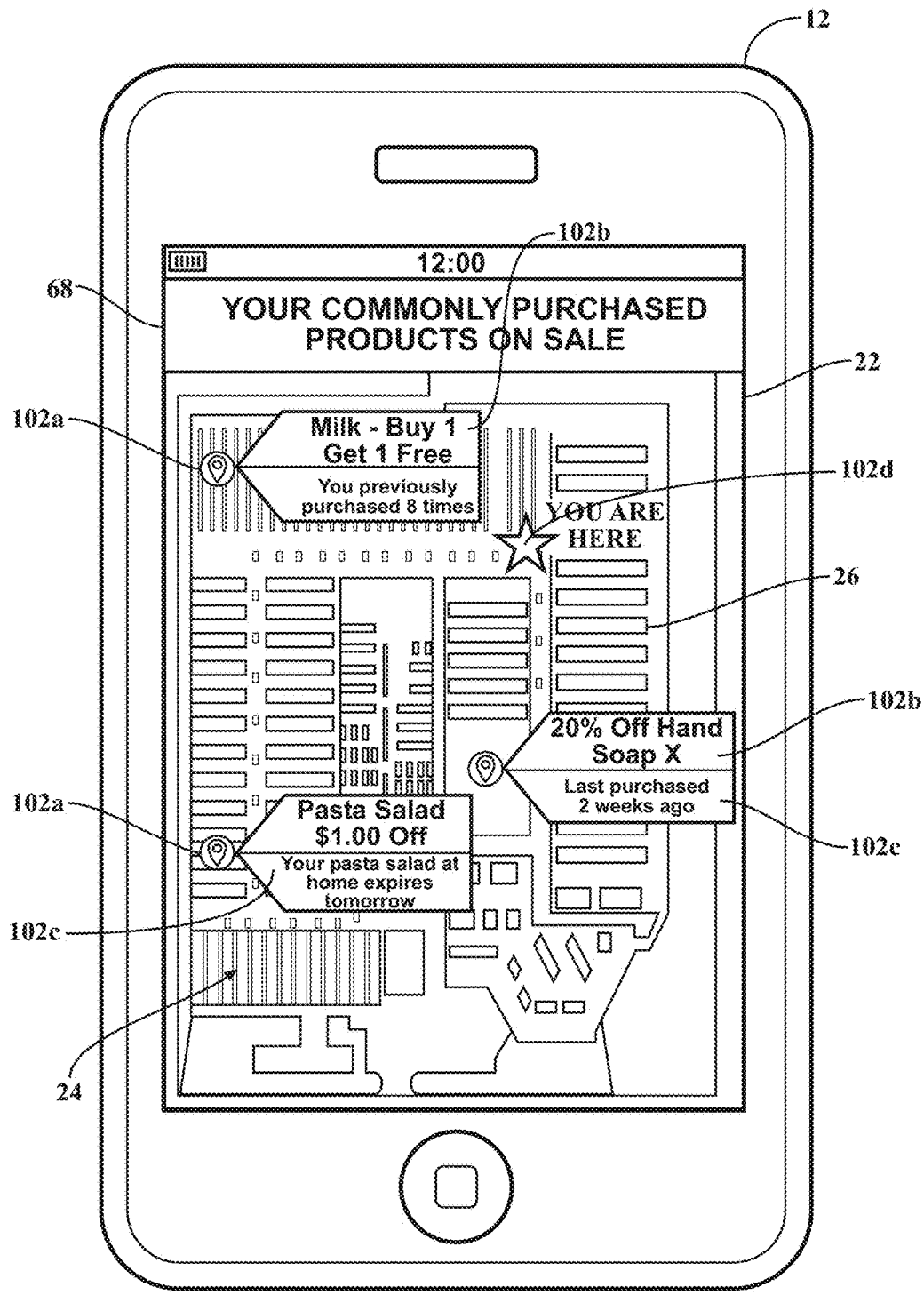
FIG. 5 is a sample screenshot of the display of a computing device presenting the consumer-specific map having product location and promotion graphics overlaid thereon, according to an embodiment of the present invention.

As shown in FIG. 5, the retail facility comprises a layout 24, such a floor plan, defining, to approximate scale, the position and location of any suitable structures, areas, and objects at the facility. In FIG. 5, the layout 24 is presented in the form of a map 26 that is presented on the display 22 of the computing device 12. The map 26 provides, among other things, a digital representation of the layout 24 of the facility, in part, or in whole.

The layout 24 may define the position and location of aisles, departments, restrooms, exits, entrances, parking areas, restaurants, and the like. These structures, areas, and objects are defined within a perimeter of the layout 24, which represents the exterior wall of the facility. Typically, each retail facility comprises its own layout 24. In some instances, retail facilities may include common layouts 24. The layout 24 of the facility is stored in an electronic format and in mediums, such as the database(s) 16 for example, to facilitate the techniques herein.

Figure 2:
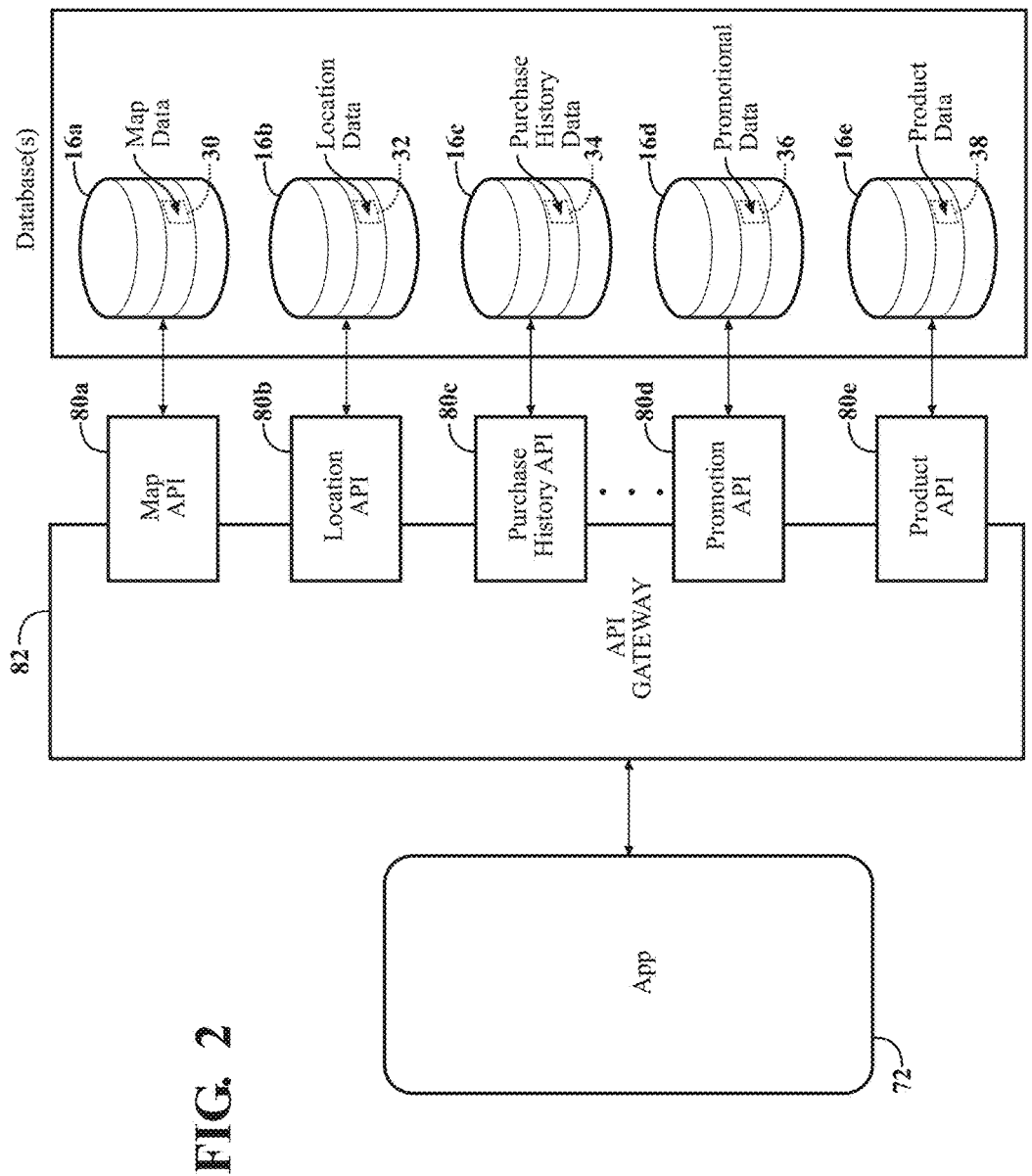
FIG. 2 is a block diagram of components involved with computer-implemented access to various sources of data for facilitating generation of the consumer-specific map, according to an embodiment of the present invention.

As shown in FIG. 2, the database(s) 16 are configured to store map data 30 relating to 24 layout of the retail facility. The map data 30 is utilized to generate the map 26 such that the map 26 is presentable on the display 22 of the computing device 12. The database(s) 16 are configured to store location data 32. The location data 32 defines a location of products for sale at the retail facility. The database(s) 16 are further configured to store purchase data 34. The purchase data 34 relates to at least one product previously purchased by a specific consumer. The database(s) 16 are further configured to store promotional data 36. The promotional data 36 relates to at least one promotion available for the products at the retail facility. The database(s) 16 are further configured to store product data 38. The product data 38 provides identifications, titles, descriptions, attributes, properties, images, etc., relating to the products offered for sale at the retail facility.

Figure 6:
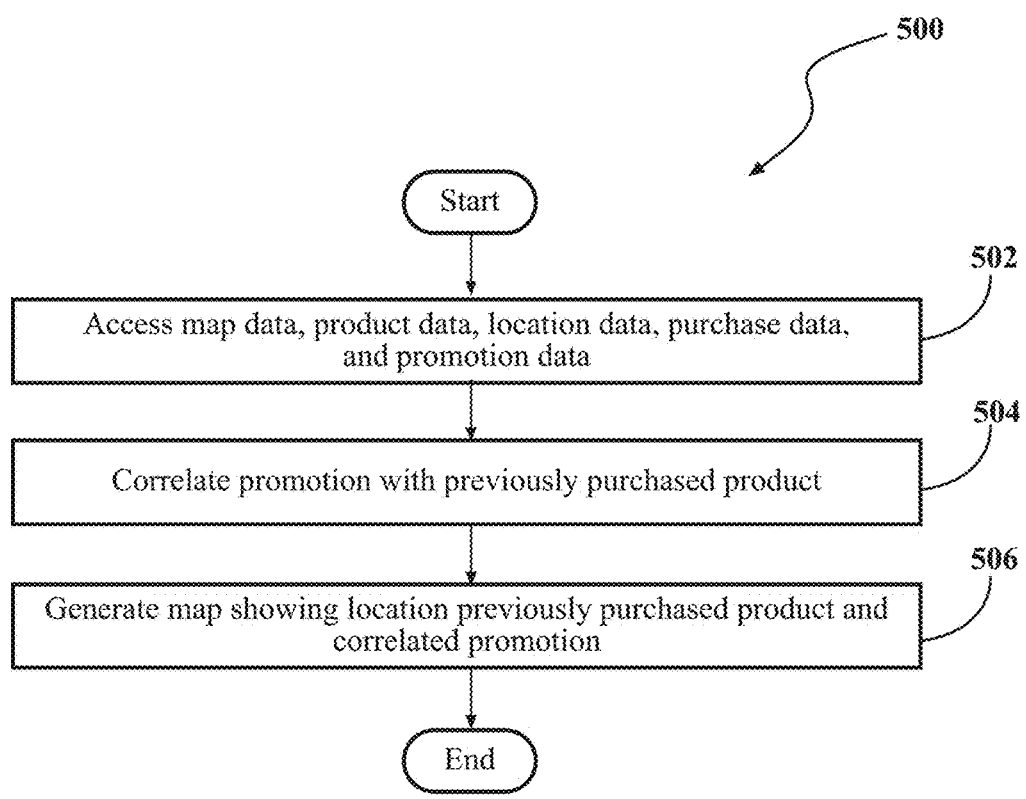
FIG. 6 is a flow diagram of a method for providing presentation of the consumer-specific map, according to one embodiment of the present invention.

As shown in FIG. 6, the system 10 implements a computer-implemented method 500. At operation 500, at least one of the processor(s) 14a, 14b and/or the search engine module 15, are configured to the access the map data 30, location data 32, purchase history data 34, promotional data 36, and product data 38. The processor 14a from the computing device 30, the processor 14b from the server 20 and/or the search module 15 may access the data 30, 32, 34, 36, 38 in order to read, analyze, and make determinations about the contents of the data 30, 32, 34, 36, 38 in furtherance of generating the map 26. The processor(s) 14a, 14b and/or search module 15 may access the data 30, 32, 34, 36, 38 using any suitable means.

Using at least the purchase history data 34, promotional data 36, and product data 38, the processor(s) 14a, 14b and/or search engine module 15 correlate the at least one promotion with the at least one product previously purchased by the specific consumer, at operation 504. In other words, the processor(s) 14a, 14b and/or search modules 15 analyze the purchase history data 34, promotional data 36, and product data 38 to link current promotions for products that currently offered for sale at the facility based on past purchases of products made by the consumer.

After the promotion is correlated with the at least one product, the processor(s) 14a, 14b, generate for presentation on the display 22 of the computing device 12 the map 26 of the layout 24 of the retail facility. As shown in FIG. 5, the map 26 indicates with respect to the layout 24, at least, the location of specific product(s) product previously purchased by the specific consumer and the correlated promotion(s) affiliated with the specific product(s). By indicating the location and promotions for the products of interest to the consumer on the map 26, the map 26 provides significant advantages to consumers and retailers. The map 26 provides an automated technique to make consumers aware of what products the consumer may need, and whether such products, if needed, are on sale. The map 26 digitally, quickly, and clearly identifies where products of interest to the specific consumer are particularly located with respect to the specific layout 24 for the retail facility.

Embodiments in accordance with the present invention may be embodied as a system, server, computer-implemented method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Various aspects and embodiments of the techniques, methods, and components summarized in this section are explained in detail below.

B. Computing Device

Various embodiments, components, and techniques related to the computing device 12 are described herein. The computing device 12 is utilized at the retail facility. For example, the consumer may carry the computing device 12 during shopping for products at the retail store.

Computing device 12 may be a portable device, wherein at least some or all of its components are formed together in a single device, which can be carried around by the individual. The computing device 12 may include any suitable device, including, but not limited to, a portable computer, a laptop or notebook computer, personal desktop assistant (PDA), a tablet, a handheld mobile device including a cellular telephone, Smartphone, Netbook, and the like.

Figure 4:
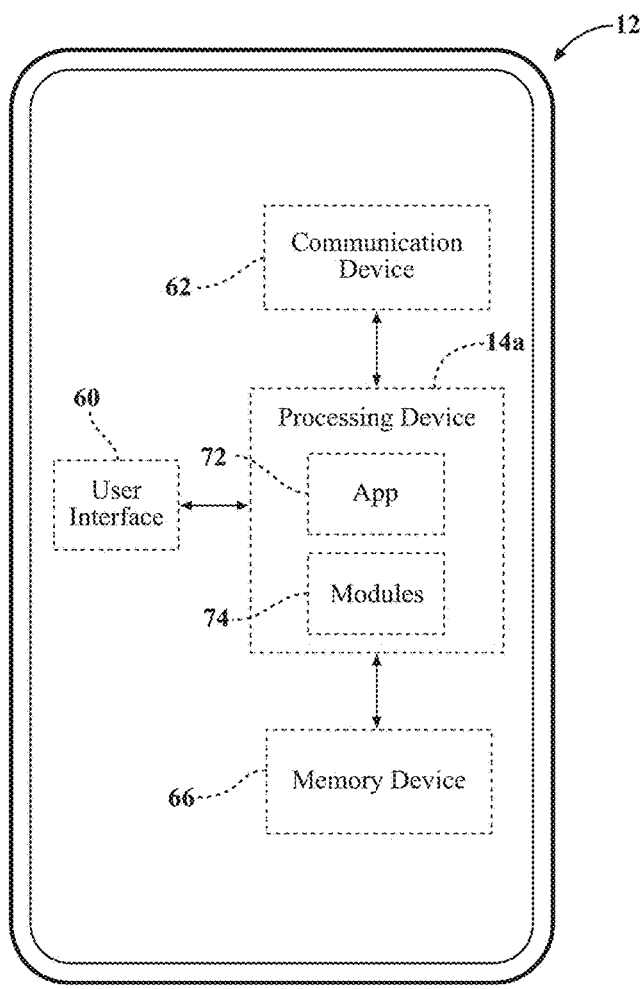
FIG. 4 is a block diagram of components of the computing device of the system, according to an embodiment of the present invention.

FIG. 4 illustrates one embodiment of the computing device 12. The computing device 12 may include a user interface 60, a communication device 62, the processing device 14a (processor), and a memory device 66. Computing device 12 includes any portable electronic device having the processor 14a for executing applications on the user interface 60 displaying information connected with the processor 14a.

On example of the user interface 60 is the aforementioned display 22, which can use any of a variety of types of display technologies, such as a liquid crystal display (LCD), a cathode-ray tube type display, an electronic ink display, a light emitting diode (LED) type display such as an OLED display, a plasma display, or the like.

Computing device 12 may include a graphical user interface (GUI) 68, as shown in FIG. 5, for interactively displaying the map 60. GUI 68 may include a plurality of input objects, which allow the consumer to provide commands to the computing device 12. GUI 68 may include an input to determine the style or settings of the map 26 that the user desires to display on GUI 68. Alternatively, the style and settings of map 26 may be predetermined without any input from the user. GUI 68 may also include input to select the desired retail facility for which the map 26 corresponds. Alternatively, the computing device 12 and/or server 20 may automatically detect the retail facility based on, for example, tracking information related to the location of the computing device 12, or the like.

FIG. 5 illustrates one example of the computing device 12 presenting the map 26 on the display 22. In FIG. 5, the GUI 68 overlays any suitable contextual information relating to the retail facility on the map 26. Such contextual information may include, for example, the location of goods, entrances and exits, registers, restrooms, and/or departments, relative to the layout 24 of the facility. Other examples of contextual information include, but are not limited to, position/location, directional or orientation data relating to the computing device 12 in relation to the layout 24. Other contextual information may also include indicators associated with the route taken by the individual through the facility and/or the length of time the computing device 12 was at different locations within the retail facility. Any of the aforementioned contextual information may be presented according to any suitable color, style, shape, and the like. The GUI 68 may overlay any suitable contextual information or data on one the map 26.

In general, the GUI 68 is embodied in a software application ("app") 72 that is run by the computing device 12. The app 72 is any suitable type of software program that facilitates performance of the techniques described herein. The app 72 may be a mobile app, if the app 72 is implemented on a mobile device. The app 72 may be pre-installed on the computing device 12 or downloaded to the computing device 12 using the internet. In one embodiment, the app 72 is developed, administered, and provided by the retailer of the facility. The app 72 utilizes the native components of the computing device 12, such as the user interface 60, the communication device 62, the processor 14a, and the memory device 66.

In some embodiments, the app 72 is hosted by the server 20. The app 72 may receive content for presentation to the user on the display 22 of computing device 12, or use such content in other functionality performed by app 72 on computing device 12. Those skilled in the art appreciate that the app 72 may have any suitable configuration without departing from the scope of the invention.

The communication device 62 is in communication with the processor 14a and is capable of sending and receiving information between one or more other computers in communication with the computing device 12. Preferably, the communication device 62 is capable of wirelessly transmitting signals to another computer, such as the server 20 using a radio transmitter and a receiver 63 connected with an antenna. This allows the computing device 12 to be used throughout the facility in mobile implementations.

The computing device 12 is in communication with the server 20 via any suitable network 18. In some embodiments, the computing device 12 may communicate with the server 20 over a cellular data network.

In some embodiments, the communication device 62 communicates with a wireless communications unit such as, e.g., a wireless router or wireless access point that provides a wireless network (wireless network or Wi-Fi). Communication device 62 allows computing device 12 to communicate with another device, e.g., tracking system, via the network 18. Communication device 62 can include one or more wireless transceivers for performing wireless communication and/or one or more communication ports for performing wired communication. The communication device 62 allows the computing device 12 to receive/send information or data to facilitate generation of the map 26.

Memory device 66 is a device that stores data generated or received by the computing device 12. Memory device 66 can include, but is not limited to, a hard disc drive, an optical disc drive, and/or a flash memory drive. Memory device 66 may be a file store, memory or some other storage medium configured to store physical components to support the app 72, such as components associated with a graphical user interface, map data, tracking data, and the like. The memory device 66 may include memory, e.g., read only memory (ROM) and random access memory (RAM), storing processor-executable instructions.

The computing device 12 may include any other suitable drives and associated computer readable memory medium to provide storage of computer readable instructions, data structures, program modules and other data for the computing device 12. Drives can include an operating system, application programs, program modules, and program data.

In some embodiments, the processor(s) 14a, 14b, as described herein, include any programmable system including systems and microcontrollers, reduced instruction set circuits (RISC), application specific integrated circuits (ASIC), programmable logic circuits (PLC), and any other circuit or processors capable of executing the functions described herein. The above examples are exemplary only, and thus are not intended to limit in any way the definition and/or meaning of the term processor. In embodiments where there are two or more processors 14a, 14b instead of one, the processors can operate in a parallel or distributed manner.

The computing device 12 further comprises any suitable input devices through which data may enter the computing device 12, either automatically or by a user who enters commands and data. Input devices can include an electronic digitizer, a barcode reader, a microphone, a camera, a video camera, a keyboard and a pointing device, commonly referred to as a mouse, a trackball or a touch pad, a pin pad, any USB device, any Bluetooth enabled device, an RFID or NFC device, and a card reader. Other input devices may include a joystick, game pad, scanner, touch screen and the like. In one or more embodiments, input devices are portable devices that can direct display or instantiation of applications running on processor 14a. The computing device 12 may further include any suitable sensors for facilitating tracking of the location, movement, direction or orientation of the computing device 12. Such sensors may include gyro-sensors, accelerometers, or the like. Additionally, processor 14a, 14b may execute any suitable modules 74 for facilitating generation of the map 26. Various embodiments of the modules 74 are described in detail below.

In one embodiment, as shown in FIG. 2, the computing device 12, and more specifically, the app 72, is configured to access at least one of the map data 30, location data 32, purchase data 34, promotion data 36, and product data 38 using at least one application programming interface (API) 80. The API 80 is a set of routines, protocols, callable methods, or tools specifying how software components should interact. The API 80 may allow embedding of information (e.g., images, video, data) relating to the data 30, 32, 34, 36, 38 or other functionality of the app 72. The API 80 may utilize any suitable interface, such as a JavaScript/JSON, XML, or Flash interface. The API 80 is configured to accesses any of the database(s) 16 or computer hardware like hard disk drives or video cards. The API 80 is used with GUI 68 and can facilitate integration of features into the app 72, thereby implementing a "plug-in API". The API 80 can also assist with sharing data, which can help to integrate and enhance the functionalities of the app 72. In one embodiment, any of the APIs 80 may be linked to internet-based sources that are operated by the retailer, such as an online retail store, or the like.

The computing device 12 may utilize a plurality of APIs 80. The APIs 80 may be in communication with and/or controlled by the app 72 to facilitate generation of the map 26. The APIs 80 may be stored in the memory device 66 of the computing device 12 and/or on the server 20. In one embodiment, the processor 14a of the computing device 12 is configured to execute the APIs 80.

As shown in FIG. 2, each source of data may be accessed by a different one of the APIs 80a-80e. For example, a map API 80a may access the map data 30, a location API 80b may access the location data 32, an purchase history API 80c may facilitate access and analysis of the purchase data 34, a promotion API 80d may access the promotion data 36, a product API 80e may access the product data 38, and the like. The APIs 80a-80e may be implemented, in part, by the app 72 running on the processor 14a of the computing device 12 and/or the processor 14b of the server 20. To manage the APIs 80a-80d, an API management protocol or API orchestration layer, such as an API gateway 82 may be utilized. The API gateway 82 may have any suitable configuration, such as an on-premise proprietary gateway that may be locally installed, a cloud-hosted gateway that redirects traffic through other servers or data APIs, a plug-in/agent gateway that provides software modules implemented within the application 72, open source gateways, or the like.

Those skilled in the art appreciate that the computing device 12 may have various other configurations not specifically described herein for implementing any of the techniques described herein. Additionally, the API(s) 80 and/or gateway 82 may have other configurations not specially recited herein without departing from the scope of the invention.

C. Server and Database(s)

Various embodiments, components, and techniques related to the server 20 and database(s) 16 are described herein. The system 10 may include the server 20 to facilitate generation of the map 26. In one embodiment, the server 20 is operated by the retailer. Alternatively, the server 20 may be operated by a third party on behalf of, or employed by, the retailer. The server 20 may be physically located at the retail facility. Alternatively, the server 20 may be physically located at a site that is remote from the retail facility.

Figure 3:
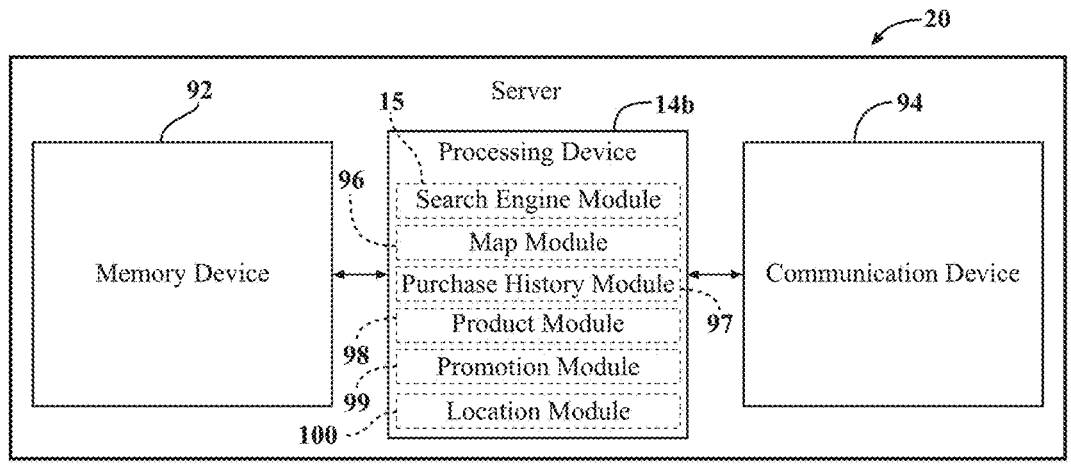
FIG. 3 is a block diagram of a server of the system, according to an embodiment of the present invention.

With reference to FIG. 3, the server 20, according to one embodiment, comprises the processing device 14b, which can communicate with a memory device 92 and a communication device 94 implemented by the server 20.

The server processing device 14b can include memory, e.g., read only memory (ROM) and random access memory (RAM), storing processor-executable instructions and one or more processors that execute the processor-executable instructions. In embodiments where the server processing device 14b includes two or more processors, the processors can operate in a parallel or distributed manner. The server processing device 14b, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor. In an example, the server processing device 14b may host the app 72 provided on the computing device 12.

The server communication device 94 allows the server 20 to communicate with another device, e.g., the computing device 12, and the like, via the network 18. The server communication device 94 can include one or more network interfaces and/or wireless transceivers for performing wireless communication and/or one or more communication ports for performing wired communication. Any of the data 30, 32, 34, 36, 38 may be transmitted by or received with the communication device 94.

The server memory device 92 stores data generated or received by the server 20. For example, the server memory device 92 may store any of the data 30, 32, 34, 36, 38. The server memory device 92 can include, but is not limited to a hard disc drive, an optical disc drive, and/or a flash memory drive. Further, the server memory device 92 may be distributed and located at multiple locations. The server memory device 92 is accessible to the processing device 14b. In some embodiments, the server memory device 92 stores the data in the database(s) 16.

The server 20 may include any suitable modules for retrieving and processing the data. For example, the server 20 may include a map module 96 configured to obtain maps corresponding to the layout 24 of any one of a plurality of retail facilities. The map module 96 is configured to access the map database 16, and any of the other data 30, 32, 34, 38, if needed, and analyze the same for facilitating generation of the map 26. Map module 96 may receive the layout 24 from a plurality of sources such as the retail facility itself, a partner of a retail facility, the internet, a blueprint, a database of WKT (well known text) objects, or any other source of map information. In some embodiments, map module 96 generates maps that include the layout 24 of the desired retail facility including product placement indicators, size of different departments, and/or aisles of the retail facility. Map module 96 may also be configured to receive map data 30 comprising only a limited layout 24 of the retail store including the positioning of the walls of the retail store.

Map module 96 may be configured to enable presentation of map data 30 associated with the retail facility on GUI 68. Map module 96 may query the map database 16a using tracking data associated with the computing device 12, e.g., RTLS coordinates, or a general location, e.g., postal zip code or city/state, and automatically determine where computing device 12 is located in relation to the layout 24 of the retail facility. Map module 96 may be configured to overlay contextual information on the layout 24.

The processing device 14b in the server 20 may additionally implement and a purchase history module 97, a product module 98, a promotion module 99, and a location module 100.

The purchase history module 97 may access the purchase data 34, and any of the other data 30, 32, 36, 38, if needed, and analyze such data to determine observations, inferences, remarks, trends, and/or patterns from past purchase history for the specific consumer and any other consumers.

The product module 98 may access and analyze the product data 38, and any of the other data 30, 32, 34, 36, if needed, and analyze such data to determine the identity and/or attributes of the products offered for sale at the retail facility and/or the identity or attributes of products previously purchased by the specific consumer.

The promotion module 99 may access and analyze the promotion data 36, and any of the other data 30, 32, 34, 38, if needed, and analyze such data to determine promotions that are currently available for products offered for sale at the retail facility and/or promotions for products previously purchased by the specific consumer.

The location module 100 may access and analyze the location data 32, and any of the other data 30, 34, 36, 38, if needed, and analyze such data to determine to determine the specific location of the products offered for sale at the retail facility in relation to the layout 24. Such locations may be locations of products previously purchased by the specific consumer.

Any of the modules 96-100 may work in conjunction with one another collectively to make the determinations of the techniques described herein. The modules 96-100 in the server 20 are optional and may not be necessary in view of the API architecture described above relating to the computing device 12. In other words, the computing device 12 may make such determinations independent of the server 20. Furthermore, in some embodiments, the data composition module or search engine module 15 may replace any one or all of the modules 96-100. Furthermore, any of the modules 96-100 may be one of the modules 72 in the computing device 12.

Any of the database(s) 16 may be operated by the retailer. Alternatively, the database(s) 16 may be operated by a third party on behalf of, or employed by, the retailer. The database(s) 16 may be physically located at the retail facility. Alternatively, the database(s) 16 may be physically located at a site that is remote from the retail facility.

The database(s) 16 may store any of the data 30, 32, 34, 36, 38. In one embodiment, as shown in FIG. 2, the system 10 comprises a plurality of databases 16a-16e. Each source of data is stored in a separate database 16a-16e. That is, the map data 30 is stored in a database 16a dedicated to the map data 30, the location data 32 is stored in a database 16b dedicated to the location data 32, the purchase data 34 is stored in a database 16c dedicated to the purchase data 34, the promotion data 36 is stored in a database 16d dedicated to the promotion data 36, and the product data 38 is stored in a database 16e dedicated to the product data 38. Additionally, each API 80a-80e can communicate directly with the database(s) 16a-16d to access the respective data from that database 16. Alternatively, any or all of the data 30, 32, 34, 36, 38 may be shared between any one or all of the databases 16a-16e.

The database(s) 16 can additionally store information associated with any individual or computing device 12. For example, the database(s) 16 can store information associated with a user account and may include account preferences and user contact information. The database 16 may be queried by the processor(s) 14a, 14b to provide information for facilitating generation of the map 26. For example, the consumer may enter login information using the app 72 and the GUI 68. This way, the identity and data of the specific consumer can be retrieved and accessed securely. The system 10 may utilize any suitable mechanism or technique to ensure privacy of the specific consumer.

In some embodiments, the database(s) 16, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The map data 30 stored in the database(s) 16a comprises data relating to 24 layout of the retail facility. As used herein, the term "map data" refers to map information defining the layout 24 of the retail facility or information otherwise relating generally to the layout 24. For example, the map data 30 may define any of the structures, areas, and objects relating to the layout 24. The map data 30 is utilized to generate the map 26 such that the map 26 is presentable on the display 22 of the computing device 12. One embodiment of the map 26, as displayed in FIG. 5, comprises boundaries for aisles, walls, and departments. The map data 30 may be generated and/or provided by the retailer or a source relating to the retailer. Those skilled in the art appreciate that the map 26 may be displayed according to any suitable configuration. For example, the map 26 may comprise a grid reference system, a Cartesian coordinate system with geospatial reference points, any suitable 2-D or 3-D virtual or real images, and the like. The map data 30 may comprise other information not specifically described herein.

The location data 32 stored in the database(s) 16b defines the location of products at the facility, and more specifically, the location of products of potential interest to the consumer on the map 26 of the layout 24. The location data 32 may define a general location (e.g., Department A), and/or a precise location (e.g., aisle 7, bin 8) where the retailer has decided to place the product for sale. The location data 32 may be generated and/or provided by the retailer or a source relating to the retailer. The location data 32 may comprise other information not specifically described herein. In some embodiments, the product data 38 may be incorporated into the location data 32. Ideally, the location data 32 is maintained or updated in real-time to maximize accuracy of the map 26 and to maximize productivity and accuracy of the map 26.

Additionally, the location data 32 may comprise the location of the computing device 12 at the retail facility.

The product data 38 stored in the database(s) 16 comprises product information about products offered for sale at the retail facility. Such product data 38 may comprise attributes of the product, including, but not limited to, the title, description, nutrition information, brand name, price of the product, or like. The product data 38 may additionally define the identity of the product, e.g., using an item name/number, identification codes, UPC codes, as well as other information associated with the products or the like. The product data 38 may also include expiration date information for perishable type goods, such as meat and dairy, or the like. Those skilled in the art appreciate that product data 38 may comprise any other suitable type of information about the product not specifically recited herein.

The purchase data 34 stored in the database(s) 16c may comprise information associated the previous purchase by the specific consumer of products offered for sale at the retail facility. For example, the purchase data 34 may identity how many times the specific consumer previously purchased a product, how many units of the product were purchased, the date/time of such purchases, and the like. The purchase data 34 may be compiled from any suitable source, such as by point-of-sale (POS) systems at the retail facility or by e-receipts that are saved and parsed by the server 20. The purchase data 34 may be generated and/or provided by the retailer or a source relating to the retailer. That is, once products are sold, the purchase data 34 may be immediately updated to reflect the loss of units offered for sale. Conversely, once products are re-stocked, the purchase data 34 may be immediately updated to reflect the addition of units offered for sale. Such updating may be based on input from sales systems at the retail facility or the computing device(s) 12. For example, such sales systems may send data from e-receipts to the server 20 such that the information from the products purchased on the e-receipts may be digitally extracted and inputted into the purchase data 34. In other embodiments, the purchase data 34 may be extracted based on a consumer's intent to purchase a good, rather than a good previously or already purchased. For example, the purchase data 34 may be extracted from a list of products inputted into a consumer's digital shopping cart on a webpage or within a mobile app. Furthermore, purchase data 34 may be extracted from various other sources or behaviors relating to the consumer, such as the search history, user preferences like "organic", "gluten-free", "dairy-free", and the like.

Ideally, the purchase data 34 is maintained or updated in real-time to maximize accuracy and productivity of the map 26. The purchase data 34 may comprise other information not specifically described herein.

Additionally, the purchase data 34 may comprise purchase history information about consumers other than the specific consumer. For example, the purchase data 34 may identify the sell rate of certain products, how many times other consumers previously purchased a product, how many units of the product were purchased by other consumers, the date/time of such purchases, and the like. The purchase data 34 may also include non-intrusive and generic demographic data relating to the other consumers who made such purchases. Such demographic data may include, for example, age, sex, residence, zip code, state, and any suitable economic data derived from other consumers. Furthermore, the purchase data 34 may comprise transitive recommendations from other consumers, such as product recommendations derived from the behavior of other consumers who have purchased similar products as the consumer.

The promotion data 36 stored in the database(s) 16 comprises data about promotions that are currently available for products offered for sale at the retail facility and/or promotions for products previously purchased by the specific consumer. For example, the promotion data 36 may identify the type of promotion, i.e., deals, bargains, discounts, and/or rebates affiliated with certain products offered for sale. The promotion data 36 may also define the promotional price information about the product, including the original price of the product absent the promotion. Additionally, the promotion data 36 may indicate the expiration date, duration, or period of the promotion. Those skilled in the art appreciate that promotion data 36 may comprise any other suitable type of information about the product not specifically recited herein.

In some embodiments, the data 30, 32, 34, 36, 38 described herein need not be separated or partitioned in isolation. Rather, it is contemplated that some of the data 30, 32, 34, 36, 38 may be mixed or incorporated into one another. For example, the location data 32 or promotion data 36 may encompass portions of product data 38, or the like.

D. Network

Various embodiments, components, and techniques related to the network 18 are described herein. The network 18 may include one or a plurality of networks 18 for facilitating communication between any one of the computing device 12, server 20, and tracking system. It will be understood that network 18 may be a combination of multiple different kinds of wired or wireless networks.

Network 18 may include any type of network that is capable of sending and receiving communication signals, including signals for multimedia content, images, data and streaming video. Network 18 may include a data network, such as the Internet, an intranet, a local area network (LAN), a wide area network (WAN), a cable network, and other like systems that are capable of transmitting information, such as digital data, and the like. Network 18 may also include a telecommunications network, such as a local telephone network, long distance telephone network, cellular telephone network, satellite communications network, and other like communications systems that interact with computer systems to enable transmission of information. Network 18 may include a plurality of data networks, a plurality of telecommunications networks, cable systems, satellite systems and/or a combination of data and telecommunications networks and other like communication systems.

The network 18 or any portion thereof may be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Those skilled in the art appreciate that various other network 18 configurations, not specifically recited herein, are possible.

E. Mapping Techniques

As described herein, any of the processor(s) 14*a*, 14*b* and/or search engine module 15 are configured to access the map data 30, location data 32, purchase data 34, promotion data 36 and product data 38 and correlate at least one promotion with the at least one product previously purchased by the specific consumer. The processor(s) 14*a*, 14*b* then generate for presentation on the display 22 of the computing device 12 the map 26 of the layout 24 of the retail facility wherein the map 26 indicates with respect to the layout 24 the location of the at least one product previously purchased by the specific consumer and the at least one promotion correlated with the at least one product previously purchased by the specific consumer.

Using the aforementioned data 30, 32, 34, 36, 38, any of the processor(s) 14*a*, 14*b* and/or the search engine module 15 can make intelligent determinations about what promotions should be correlated with certain products of interest to the specific consumer, and vice-versa.

Determinations about which promotions should be correlated with certain products may be made using predefined threshold values relating to attributes of the purchase data 34. For example, if a product was only purchased once by the specific consumer over a two year window, the processor(s) 14*a*, 14*b* may determine that the product may be of less interest to the consumer, and thereafter, determines that this particular product should not be promoted on the map 26. Conversely, if a product is purchased by the specific consumer every month, the processor(s) 14*a*, 14*b* may determine that the product is of more interest to the consumer, and thereafter, determines that this particular product promoted and potentially emphasized on the map 26. The predefined threshold values may be any other suitable values and be based on any suitable other purchase data 34 metric not specially recited herein.

In this sense, the processor(s) 14*a*, 14*b* may determines priorities about what products, among those previously purchased by the consumer, are most suitable to be chosen for promotion correlation, and/or what promotions, among those available from all promotions, are most suitable to be chosen for previously purchased products. Thus, the processor(s) 14*a*, 14*b* may rank the product-promotion combinations based which combinations are most profitable, which products have the highest turnover, and/or which products provide the greatest ROI, and the like. In this way, such intelligent determinations by the processor(s) 14a, 14b optimize sales by selectively promoting products that are more likely to be sold to the consumer or generate more income/profit for the retailer.

In some embodiments, any of the processor(s) 14a, 14b are further configured to determine patterns or trends based on the purchase data 34. For example, knowing the change in the quantity of purchase of a product by the specific consumer or other consumers over time may help to determine whether a promotion should be correlated with a product, or the like. This allows predictions to be made about what promotion correlations are likely to be most successful.

One example of the map 26 displayed on the computing device 12 is provided in FIG. 5. Although, it should be appreciate that the map 26 may have various other configurations other than the configuration depicted in FIG. 5. The map 26 comprises the layout 24 of the facility, in part or in whole. When provided in whole, the map 26 provides an overview of the whole retail facility. The layout 24 in the map 26 need not provide all information relating to the structures, areas, and objects at the facility. Any appropriate information may be omitted from the layout 24 for suitable reasons, such as confidentiality, safety, redundancy, or efficiency. As such, the map 26 need not include every detail of the layout 24. Rather, the map 26 is provided to give the user of the computing device 12 context as to where the promoted products are located, and optionally where the user is generally located at the retail facility, such locating the promoted products can be easily performed.

The map 26 may have variable zoom such that the user of the computing device 12 can zoom the map 26 in or out. The GUI 68 may provide a zoom interface for allowing the user to specify the zoom level of the map 26. The map 26 may have any suitable resolution for facilitating identification of the products.

In one embodiment, the map 26 is configured such that the entirety of the layout 24 presented in the map 26 is static. That is, the map 26 remains in a constant state and neither zooms-in, rotates, etc. In other embodiments, the map 26 is dynamic and is configured such that the layout 24 changes dependent on changes in the location of the computing device 12. That is, as the computing device 12 moves throughout the retail facility, the map 26 may follow the location and/or orientation of the computing device 12. For instance, the map 26 may be configured to automatically center based on the current location of the computing device 12 tracked by the tracking system. Other features of the tracking system can be found in commonly owned U.S. patent application Ser. No. 15/010,354, filed on Jan. 29, 2016 and commonly owned U.S. patent application Ser. No. 15/010,449, filed on Jan. 29, 2016, which are hereby incorporated by reference in their entirety.

Additionally, the map 26 may be configured to automatically rotate the layout 24 presented based on the orientation or direction of the computing device 12, which is representative of the direction that the individual is standing at the facility.

The map 26 is generated, in part, based on the map data 30, location data 32, and purchase data 34, promotional data 36, and product data 36. For example, the map data 30 is utilized to generate the layout 24 of the map 26 for the specific retail facility. The location data 32 is utilized to pinpoint the location of the products of interest on the map 26. The purchase data 34 is utilized to facilitate display on the map 26 of the observations, remarks, or predications about the product previously purchased by the consumer. In some embodiments, the map 26 may use some of, but not all of the sources of data 30, 32, 34 36, 38. In other embodiments, the map 26 uses all of the sources of data 30, 32, 34 36, 38.

The map 26 is configured such that graphics 102 are overlaid thereon. The map 26 displays graphics 102 relating to products in the retail facility. For example, as shown in FIG. 5, the map 26 displays a product location graphic 102a, which denotes the current location of the product previously purchased by the consumer at the facility. Said differently, the product location graphic 102a identifies the location of a product currently offered for sale at the retail facility that is the same as or similar to a product previously purchased by the consumer. Any of the processor(s) 14a, 14b are configured to generate the product location graphic 102a and overlay the product location graphic 102a at the location of the products on the map 26. In one example, the product location graphic 102a is denoted by a pin-drop. In FIG. 5, the product location graphic 102a for each product is placed at specific aisles and locations within the aisle where the respective product is placed for sale.

The product location graphic 102a may indicate other location information about the product, including, but not limited to, notes about where exactly the product is located. The product location graphic 102a may indicate what side of the aisle, what shelf or bin the product, and/or any other information about where the product is placed. Such information can be denoted by the product location graphic 102a using visual or textual graphics. The product location graphic 102a can be represented in geographic coordinates, Cartesian coordinates, e.g., an (x, y) point if the facility is divided into a Cartesian plane, a combination of coordinate system or reference points within other coordinate systems, or the like. A series of reference points allow mapping from one coordinate system, e.g., Cartesian, to another coordinate system, e.g. geographical, and the like. Those skilled in the art appreciate that the location of the product may be denoted by other graphics not specifically recited herein and that the product location graphic 102a may indicate other location information about the product not specifically recited herein.

Another graphic that can be overlaid on the map 26 is a promotional graphic 102b, which indicates promotional information correlated with the product located on the map 26. As shown in FIG. 5, the promotional graphic 102b according to one example comprises a text box that is linked to the product location graphic 102a of the product. The text box identifies any of the attributes of the promotion, as described herein. For example, as shown in FIG. 5, the promotional graphics 102b display a "buy 1 get 1 free" promotion for a specific milk product, a "20% off" sale for a specific hand soap product, and a "$1.00 off" deal for a specific pasta salad product, each of which has been previously purchased by the consumer at one point or another. Such information can be denoted by the promotional graphic 102b using visual, textual, static, or animated graphics. Promotional graphic 102b may also indicate additional information, such as details derived from the product data 38. For example, the promotional graphic 102b may identify specific attributes of product correlated with the promotion so that the consumer is aware of specifically what product has such promotion. Of course, it is contemplated that product data 38 may be displayed using a graphic independent of the promotional graphic 102b.

In yet another example, the promotional graphic 102*b* may additionally provide a product pop-up that comprises an image or video to provide the consumer with supplemental information about the product, promotion, or the like. The pop-up may be selectively accessible via any suitable technique, such as clicking on any of the graphics 102, or the like. The product images or videos may be stored in the database(s) and the clicking on the graphic 102 may open a hyperlink to the pop-up. In at least this way, the map 26 can also be interactive allowing the consumer to access layers of map data 30, location data 32, purchase data 34, promotion data 36 and/or product data 38 hidden initially from the displayed map 26. Those skilled in the art appreciate that the promotional information of the product may be denoted by other graphics not specifically recited herein and that the promotional graphic 102*b* may indicate other information about the product or promotion not specifically recited herein.

Another graphic 102 that may be overlaid on the map 26 is a purchase history graphic 102*c*. The purchase history graphic 102*c* displays information derived from the purchase data 34. As mentioned, the processor(s) 14*a*, 14*b* are further configured to generate, using the purchase data 34, observations, inferences, remarks, trends, and/or patterns from past purchase history for the specific consumer and any other consumers. The purchase history graphic 102*c* may be presented to display such observations, inferences, remarks, trends, and/or patterns for the knowledge of the consumer and for supplemental promotion of the sale of the product. For example, as shown in FIG. 5, one purchase history graphic 102*c* comprises a text box indicating, "You previously purchased 8 times." This purchase history graphic 102*c* is based on an observation made about the previous number of units of product purchased. This signifies to the consumer that the promoted product is one that has been repeatedly purchased by the consumer, thereby potentially reminding the consumer that this product should be purchased again. Another purchase history graphic 102*c* in FIG. 5 indicates that the promoted product was "last purchased 2 weeks ago." This purchase history graphic 102*c* is based on an observation made about the frequency of purchase. This signifies to the consumer to think about whether the promoted product is in need of purchase given the last date of purchase. Yet another example of a purchase history graphic 102*c* in FIG. 5 displays that "your pasta salad at home expires tomorrow." This purchase history graphic 102*c* is based on an inference made knowing the expiration date of the product from the product data 38 in conjunction with date of purchase from the purchase data 34. This signifies to the consumer that the promoted product is one that should be purchased to replace the previously existing purchased product.

Additionally, the purchase history graphic 102*c* may be based on a prediction derived from any of the sources of data 30, 32, 34, 36, 38. For example, the purchase history graphic 102*c* may indicate, "You probably need milk," or the like. In yet another example, the purchase history graphic 102*c* is based on the purchase history of other consumers. For example, the purchase history graphic 102*c* may indicate, "This is the most purchased product this week," "This is a hot product in your community," and the like. Any suitable algorithm may be utilized to determine the content and style of the phrasing provided purchase history graphics 102*c*, if utilized. Such purchase history graphics 102*c* may have any other suitable form, such as a chart, graph, or the like. Those skilled in the art appreciate that the purchase data 34 may be denoted by other graphics not specifically recited herein and that the purchase history graphics 102*c* may indicate other information about the product or purchase history not specifically recited herein.

In one embodiment, any of the processor(s) 14*a*, 14*b* and/or search engine module 15 are configured to access purchase data 34, and any of the other sources of data 30, 32, 36, 38 and correlate observations, inferences, remarks, trends, and/or patterns from past purchase history for the specific consumer and any other consumers with a product offered for sale by the retail facility. The processor(s) 14*a*, 14*b* may then generate for presentation on the display 22 of the computing device 12 the map 26 of the layout 24 of the retail facility wherein the map 26 indicates with respect to the layout 24 the location of the product and the at least one correlated observation, inference, remark, trend, and/or pattern determined from the purchase data 34. For example, processor(s) 14*a*, 14*b* and/or search engine module 15 may analyze the consumer's purchase history and determine the consumer is "due or nearly due to purchase this product" based on their buying history and that specific product history and last purchase date. This technique may be performed independent of, and in lieu of, presenting promotional data on the map 26. Accordingly, presenting such information based on the purchase data 34 may be persuasive enough, in some circumstances, to promote the sale of the products without relying on promotion data 36.

In some embodiments, another graphic 102 that may be overlaid on the map 26 is a consumer tracking graphic 102*d*. The consumer tracking graphic 102*d* indicates the location of the computing device at the retail facility. In the example, as shown in FIG. 5, the consumer tracking graphic 102*d* is denoted by a star that is positioned at the location of the facility where the computing device 12 is located. Of course, other graphics styles may be used, such as a compass, a pin-point, an arrow, and or the like. The system 10 may utilize the tracking system to determine where the computing device 12 is located.

In one embodiment, processor(s) 14*a*, 14*b* are further configured to present the location of the previously purchased product on the map 26 using the product location graphic 102*a* only if the location of the computing device 12 is within a predetermined proximity to the location of the product. For example, the predetermined proximity may be 20 ft, 50 ft, 100 ft, or the like. Conversely, processor(s) 14*a*, 14*b* may be further configured to hide the product location graphics 102*a* on the map if the location of the computing device 12 is beyond the predetermined proximity to the location of the product. If the consumer is distant from the promoted product, or if there are a significant amount of product location graphics 102*a* presented on the map 26 thereby making the map 26 more difficult to read, this feature may help the consumer focus on certain promoted products within the predetermined proximity. Of course, similar techniques may be applied with the promotional graphics 102*b* and/or purchase history graphics 102*c* as described herein.

Those skilled in the art appreciate that other objects, items, or features at the retail facility may be represented by overlaying graphics 102. Additionally, any of the graphics 102 described herein may have other suitable shapes, forms, styles, colors, and the like, without departing from the scope of the invention. For instance, any of the graphics 102 may be animated or static. In addition, the graphics 102 may be overlaid according to any suitable method, including, but not limited to layering, image overlay, video overlay, or the like.

Reference throughout this specification to "one embodiment", "an embodiment", "one example" or "an example"

means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

In the preceding description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

A computing device, server or computer, such as described herein, includes at least one or more processors or processing units and a system memory (see above). Any of the aforementioned devices may include form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific examples are provided for explanation purposes and that other techniques may also be employed in other embodiments and examples in accordance with the teachings of the present disclosure.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
   at least one database comprising:
      map data defining a layout of a retail facility;
      product data identifying products for sale at the retail facility;
      location data defining a location of each product of the products for sale at the retail facility;
      purchase data relating to at least one product previously purchased by a specific consumer, the products comprising the at least one product previously purchased by the specific consumer; and
      promotion data identifying at least one promotion available for the products at the retail facility;
   a search engine module configured to access the map data, the location data, the purchase data, and the promotion data;

a tracking system for determining a location of a computing device at the retail facility; and
a processor configured to:
correlate, using the product data, the purchase data and the promotion data, the at least one promotion with the at least one product previously purchased by the specific consumer;
generate for presentation on a display of the computing device (a) a map of the layout of the retail facility wherein the map indicates, with respect to the layout, the location of the at least one product previously purchased by the specific consumer and (b) the at least one promotion correlated with the at least one product previously purchased by the specific consumer; and
hide the location of the at least one product previously purchased by the specific consumer on the map when the location of the computing device is beyond a predetermined proximity to the location of the at least one product previously purchased by the specific consumer.

2. The system of claim 1 wherein the processor is further configured to (a) generate at least one graphic indicating the location of the at least one product previously purchased by the specific consumer and (b) overlay the at least one graphic on the map.

3. The system of claim 1 wherein the processor is further configured to (a) generate at least one graphic indicating the at least one promotion correlated with the at least one product previously purchased by the specific consumer and (b) overlay the at least one graphic on the map.

4. The system of claim 1 wherein the processor is further configured to generate, using the purchase data, an observation relating to the at least one product previously purchased by the specific consumer.

5. The system of claim 4, wherein the observation comprises at least one of:
a count of prior purchases of the at least one product previously purchased by the specific consumer;
a number of units of the at least one product previously purchased by the specific consumer in a latest purchase of the prior purchases; or
a frequency of the prior purchases.

6. The system of claim 4 wherein the processor is further configured to (a) generate at least one graphic indicating the observation relating to the at least one product previously purchased by the specific consumer and (b) overlay the at least one graphic on the map.

7. The system of claim 1 wherein the processor is further configured to (a) generate at least one graphic indicating the location of the computing device at the retail facility and (b) overlay the at least one graphic on the map.

8. The system of claim 1 wherein the processor is further configured to present the location of the previously purchased product on the map only when the location of the computing device is within the predetermined proximity to the location of the product.

9. The system of claim 1 wherein the purchase data further relates to at least one product previously purchased by consumers other than the specific consumer and wherein the processor is configured to further correlate the at least one promotion with the at least one product previously purchased by the specific consumer based on the at least one product previously purchased by the consumers other than the specific consumer.

10. The system of claim 1 wherein the processor is configured to analyze the purchase data over time to determine trends or patterns for predicting which of the at least one product previously purchased by the specific consumer should be correlated with the at least one promotion.

11. A computer-implemented method, including the steps of:
accessing, with a search engine module, from at least one database:
map data defining a layout of a retail facility;
product data identifying products for sale at the retail facility;
location data defining a location of each product of the products for sale at the retail facility;
purchase data relating to at least one product previously purchased by a specific consumer, the products comprising the at least one product previously purchased by the specific consumer; and
promotion data identifying at least one promotion available for the products at the retail facility;
analyzing, using a processor, the map data, the location data, the product data, the purchase data and the promotion data;
correlating, using the processor, the at least one promotion with the at least one product previously purchased by the specific consumer;
generating, using the processor, (a) a map of the layout of the retail facility that is presentable on a display of a computing device, wherein the map indicates, with respect to the layout, the location of the at least one product previously purchased by the specific consumer and (b) the at least one promotion correlated with the at least one product previously purchased by the specific consumer;
determining, using a tracking system, a location of the computing device at the retail facility; and
hiding, using the processor, the location of the at least one product previously purchased by the specific consumer on the map when the location of the computing device is beyond a predetermined proximity to the location of the at least one product previously purchased by the specific consumer.

12. The computer-implemented method of claim 11 further comprising the steps of (a) generating, using the processor, at least one graphic indicating the location of the at least one product previously purchased by the specific consumer and (b) overlaying, using the processor, the at least one graphic on the map.

13. The computer-implemented method of claim 11 further comprising the steps of (a) generating, using the processor, at least one graphic indicating the at least one promotion correlated with the at least one product previously purchased by the specific consumer and (b) overlaying, using the processor, the at least one graphic on the map.

14. The computer-implemented method of claim 11 further comprising the step of generating with the processor, an observation relating to the at least one product previously purchased by the specific consumer based on the purchase data.

15. The system of claim 14, wherein the observation comprises at least one of:
a count of prior purchases of the at least one product previously purchased by the specific consumer;
a number of units of the at least one product previously purchased by the specific consumer in a latest purchase of the prior purchases; or
a frequency of the prior purchases.

16. The computer-implemented method of claim 14 further comprising the steps of (a) generating, using the processor, at least one graphic indicating the observation relating to the at least one product previously purchased by the specific consumer and (b) overlaying, using the processor, the at least one graphic on the map.

17. The computer-implemented method of claim 11 further comprising the steps of (a) generating, using the processor, at least one graphic indicating the location of the computing device at the retail facility and (b) overlaying, using the processor, the at least one graphic on the map.

18. The computer-implemented method of claim 11 further comprising the step of presenting, using the processor, the location of the previously purchased product on the map only when the location of the computing device is within the predetermined proximity to the location of the product.

19. The computer-implemented method of claim 11 wherein correlating, using the processor, the at least one promotion with the at least one product previously purchased by the specific consumer is further performed based on purchase data relating to at least one product previously purchased by consumers other than the specific consumer.

20. One or more non-transitory computer-readable storage media, having computer-executable instructions embodied thereon, wherein when executed by at least one processor, the computer-executable instructions cause the processor to:
  access from at least one database:
    map data defining a layout of a retail facility;
    product data identifying products for sale at the retail facility;
    location data defining a location of each product of the products for sale at the retail facility;
    purchase data relating to at least one product previously purchased by a specific consumer, the products comprising the at least one product previously purchased by a specific consumer; and
    promotion data identifying at least one promotion available for the products at the retail facility;
  analyze the map data, the location data, the product data, the purchase data and the promotion data;
  correlate the at least one promotion with the at least one product previously purchased by the specific consumer;
  generate (a) a map of the layout of the retail facility that is presentable on a display of a computing device, wherein the map indicates, with respect to the layout, the location of the at least one product previously purchased by the specific consumer and (b) the at least one promotion correlated with the at least one product previously purchased by the specific consumer;
  determine a location of the computing device at the retail facility; and
  hide the location of the at least one product previously purchased by the specific consumer on the map when the location of the computing device is beyond a predetermined proximity to the location of the at least one product previously purchased by the specific consumer.

* * * * *

UNITED STATES PATENT AND TRADEMARK OFFICE
CERTIFICATE OF CORRECTION

PATENT NO. : 10,395,296 B2
APPLICATION NO. : 15/010394
DATED : August 27, 2019
INVENTOR(S) : Benjamin Pellow et al.

It is certified that error appears in the above-identified patent and that said Letters Patent is hereby corrected as shown below:

In the Claims

Column 22, Line 58 (Line 1 of Claim 15), please change "system" to --computer-implemented method--.
Column 24, Line 6 (Line 15 of Claim 20), please change "a" to --the--.

Signed and Sealed this
Twenty-sixth Day of November, 2019

Andrei Iancu
*Director of the United States Patent and Trademark Office*